July 4, 1933.                W. H. T. HOLDEN                 1,916,316
                           BATTERY CONTROL CIRCUIT
                            Filed March 17, 1930
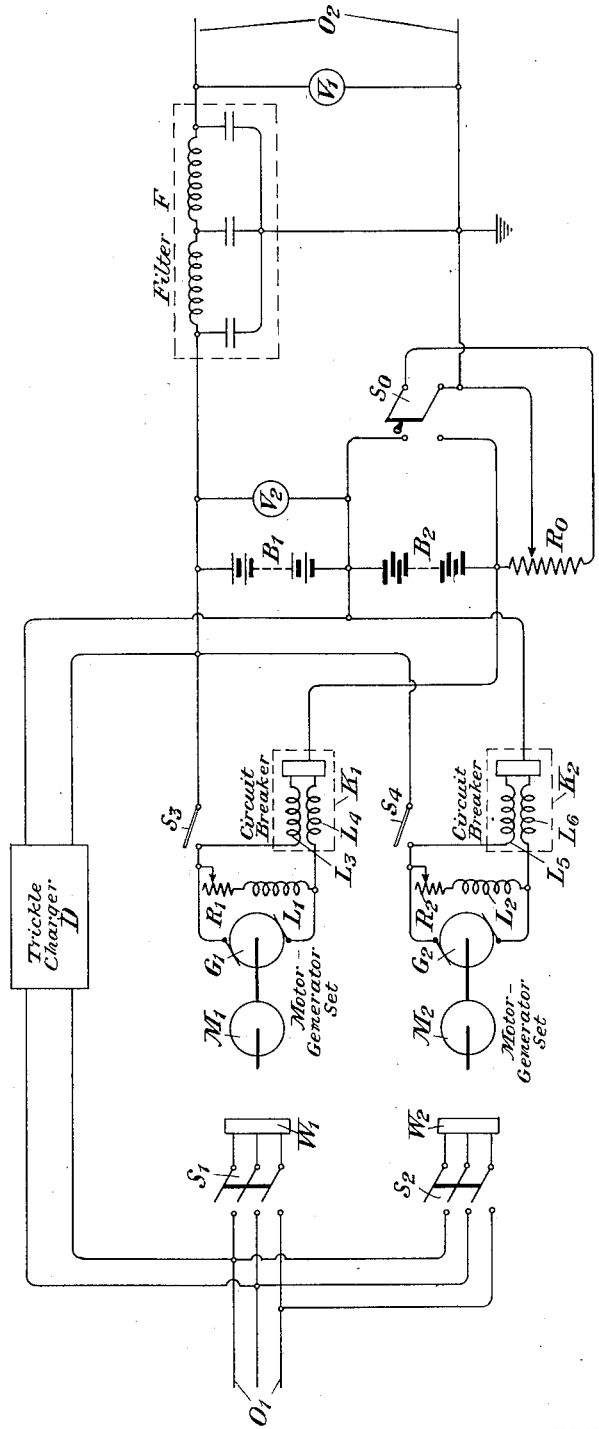
INVENTOR
W. H. T. Holden
BY
ATTORNEY Patented July 4, 1933

1,916,316

UNITED STATES PATENT OFFICE

WILLIAM H. T. HOLDEN, OF BROOKLYN, NEW YORK, ASSIGNOR TO AMERICAN TELEPHONE AND TELEGRAPH COMPANY, A CORPORATION OF NEW YORK

BATTERY CONTROL CIRCUIT

Application filed March 17, 1930. Serial No. 436,545.

This invention relates to circuits and apparatus for producing substantially constant direct current voltages. More particularly, this invention relates to control circuits and apparatus for a storage battery whereby abrupt changes in the voltage at the beginning and end of charge and discharge may be eliminated.

This invention will be described in connection with the accompanying drawing showing one embodiment thereof merely for the purpose of illustration.

Referring to the drawing, reference character $O_1$ designates a source of three-phase alternating current of any frequency which may be, for example, 60 cycles per second. A triple-pole single-throw switch $S_1$ may be operated to connect this source with the field windings $W_1$ of a motor $M_1$ which is mechanically coupled to a generator $G_1$. Another triple-pole single-throw switch $S_2$ may be similarly operated to connect the source $O_1$ with the field windings $W_2$ of a motor $M_2$ which is mechanically coupled to a generator $G_2$. The armature of the generator $G_1$ is shunted by a field winding $L_1$ and a rheostat $R_1$, which are connected in series relationship. The armature of the generator $G_2$ is shunted by a similar arrangement including a field winding $L_2$ and a rheostat $R_2$. The rheostats $R_1$ and $R_2$ may be manipulated in order to control the voltages derived from generators $G_1$ and $G_2$, respectively.

Circuit breakers $K_1$ and $K_2$ are associated with the generators $G_1$ and $G_2$, respectively. The circuit breaker $K_1$ includes two windings $L_3$ and $L_4$, which are in inductive relationship. Winding $L_3$ is connected in shunt with the armature of the generator $G_1$, while winding $L_4$ is in series with the armature of this generator. These windings produce similarly poled magnetic fields while the generator $G_1$ is supplying current to its connected circuits, yet when the direction of the current is reversed, the magnetic fields of these windings become mutually opposite, operating an armature or other movable element so as to break the circuit. The circuit breaker $K_2$ includes similar mutually reactive windings $L_5$ and $L_6$ which function in the same manner as windings $L_3$ and $L_4$ just described. Thus, as current begins to flow into either of the generators $G_1$ or $G_2$, the associated circuit breaker will operate so as to open the circuit in order to prevent the destruction of the generator armature.

The reference character $B_1$ designates a battery of secondary cells or other sources of electromotive force, and this may be a storage battery each of the cells of which may include a plurality of lead plates immersed in a solution of sulphuric acid, as is well known in the art. The reference character X will be employed to represent the number of cells forming battery $B_1$. A battery $B_2$ is composed of a plurality of sources of counter-electromotive force, each of which consists of two or more electrodes, which may be of nickel, immersed in a fluid conductor, which may be an alkaline solution. The reference character Y will be employed to designate the number of cells forming battery $B_2$.

Before proceeding with the specification, it may be well to compare the properties of each of the cells of battery $B_1$ with each of those of battery $B_2$. Current may only pass between the electrodes of each of the cells of battery $B_2$ upon decomposition of the electrolyte into ions. This current cannot be established until the electromotive force impressed across the terminals of the cell is sufficient to perform the work of decomposition, and a current having a smaller electromotive force than that required to perform such work (the latter being termed the "critical voltage") cannot be transmitted through the electrolyte. Thus, the counter-electromotive force of each cell opposes the passage of current, and in a cell of the nickel-alkaline type the critical voltage is approximately 1.75 volts. This counter-electromotive force is comparatively constant and of course, its critical value may be changed by the use of electrodes of different material, or by the inclusion of a different fluid conductor, or by changing the spacing of the electrodes. The difference between each cell of counter-electromotive force of battery $B_2$ and each secondary cell of battery $B_1$ is that, while the former is able to offer the counter-force to the passage of a current through it in either direction, it is unable per se to create or maintain a current. The secondary cell, on the other hand, offers a counter-force to the passage of a current in only one direction and it adds its current-producing capacity to a current passing through it in the opposite direction, the latter direction being the one corresponding to that of the current which the battery itself is capable of creating and maintaining.

Proceeding now with the specification, it will be seen that the upper terminal of a rheostat $R_0$ is connected to the lower terminal of the battery $B_2$, while the other terminal of the rheostat is connected to one of the blades of a double-pole single-throw switch $S_0$. The other blade of the switch $S_0$ is connected to the movable arm of the rheostat $R_0$. The remaining two terminals of the switch $S_0$ are connected to the outer terminals of the battery $B_2$. So, it will be seen that when the switch $S_0$ is open, the rheostat $R_0$ will be in series with batteries $B_1$ and $B_2$ and that when it is closed, rheostat $R_0$ will be in shunt with the battery $B_2$.

An output circuit $O_2$ is connected between the variable arm of the rheostat $R_0$ and the upper terminal of the battery $B_1$ through a filter F which is of the low-pass type and includes equal series inductances and equal shunt capacitive elements. The output circuit $O_2$ is shunted by a voltmeter $V_1$. A similar voltmeter is connected in shunt with the battery $B_1$. One side of the output circuit $O_2$ may be grounded, as shown.

A trickle-charger D, of any well known type, is connected between two of the conductors leading to the source $O_1$ and the battery $B_1$. The current supplied normally by the trickle-charger D has an amplitude of between one-half and one per cent of the eight-hour charging rate of the battery $B_1$. A current of this amplitude will compensate for the losses in the cells of the battery $B_1$ resulting from local action, leakage and self-discharge.

A switch $S_3$ may be operated for the purpose of connecting the generator $G_1$ in series with batteries $B_1$ and $B_2$ through the circuit breaker $K_1$. A similar switch $S_4$ may be operated to connect the generator $G_2$ with the battery $B_1$ through the circuit breaker $K_2$.

The number of secondary cells required for battery $B_1$ may be determined from the voltage assigned to the output circuit $O_2$ and from the voltage of each of these cells when it is completely discharged. If it be assumed that each secondary cell is completely discharged when its terminal voltage is about 1.75 volts, the number of cells required may be roughly obtained by dividing the voltage assigned to the circuit $O_2$ by 1.75. It is interesting here to note that when the battery $B_1$ is being properly floated under normal conditions, each cell will exhibit about 2.15 volts, and that each cell may exhibit approximately 2.6 volts or more when it is fully charged and the charging current is flowing.

Each of the cells of counter-electromotive force of battery $B_2$ presents a large resistance when the impressed voltage per cell is less than the critical voltage (1.75 volts per cell). If the voltage of the generator $G_1$ becomes greater than the voltage of the battery $B_1$ by an amount which is less than the value obtained by multiplying the critical voltage of each cell (1.75 volts) forming battery $B_2$ and Y, which represents the number of cells in battery $B_2$, then substantially no current will flow from battery $B_1$ into the output circuit $O_2$, nor will current flow from generator $G_1$ into battery $B_1$. In that case the voltage across the output circuit $O_2$, as indicated by the voltmeter $V_1$, will be approximately equal to the voltage produced by generator $G_1$.

When the power service fails so that the armature of the generator $G_1$ is unable to rotate, switch $S_0$ being open and the movable arm of rheostat $R_0$ being at its uppermost position, the voltage across the output circuit $O_2$, as indicated by the voltmeter $V_1$, will be reduced to that voltage corresponding to the difference in the voltage drops across batteries $B_1$ and $B_2$. Upon the closure of switch $S_0$, the rheostat $R_0$ will be connected in parallel with the battery $B_2$ and the voltage $V_1$ at the output circuit $O_2$ may be maintained constant by controlling the rheostat $R_0$. As soon as the potential drop across the rheostat becomes less than the critical voltage of battery $B_2$, practically all of the current will flow through the rheostat and the voltage at the output circuit $O_2$ will be approximately equal to the difference between the voltage of battery $B_1$ and the drop in voltage across the rheostat, through which practically all of the current transmitted to circuit $O_2$ will flow. It will be necessary to gradually reduce the resistance of the rheostat $R_0$ as the battery $B_1$ discharges, and at full discharge all of the resistance of the rheostat $R_0$ will be cut out.

The rheostat $R_0$ should include resistance of such a value that when all of its resistance is connected across the battery $B_2$ under normal conditions, the potential drop across the rheostat will be somewhat greater than the critical voltage of the battery $B_2$. If the voltage drop across the rheostat under these conditions exceeds, for example, the value 1.75Y volts, the rheostat will then be properly designed, and when the switch $S_0$ is closed upon the discharge of battery $B_1$, only a part of the current from battery $B_1$ will flow through the rheostat. It will be apparent that if the switch $S_0$ is closed immediately upon the discharge of battery $B_1$, proper manipulation of the rheostat $R_0$ will prevent any appreciable variation in the voltage across the circuit $O_2$.

When the power service is restored, the switches $S_3$ and $S_4$ may be closed so that the effects of generators $G_1$ and $G_2$ may be respectively impressed upon the attached circuits. In that event, the switch $S_0$ may at first be maintained closed and the rheostat increased in resistance until the voltage across battery $B_1$, as indicated by the voltmeter $V_2$, is greater than the value attained by multiplying 2.15 by X, the number of cells in battery $B_1$. Further increase in the voltage of the battery $B_1$ beyond the value just determined will cause current to flow from generator $G_2$ into the output circuit $O_2$ because the difference between the voltages of batteries $B_1$ and $B_2$ will be substantially greater than the voltage assigned to the output circuit $O_2$. This may be overcome by increasing the voltage of generator $G_1$, which, of course, may be accomplished by the adjustment of the rheostat $R_1$. The voltage of generator $G_1$ should be so large as to maintain the voltage drop across battery $B_2$ below the critical value.

In order to prevent the voltage of the output circuit $O_2$ from increasing too greatly, the switch $S_0$ may be opened so as to connect the rheostat $R_0$ in series with batteries $B_1$ and $B_2$ and with the circuit $O_2$. The resistance of the rheostat $R_0$ may then gradually be increased in order to maintain the voltage $V_1$ across the output circuit $O_2$ substantially at the assigned value.

When the battery $B_1$ becomes fully charged, at which time the voltage $V_2$ will be greater than the product of 2.6 and X, then the switch $S_4$ may be opened so as to disconnect the charging generator $G_2$ from the battery $B_1$. The trickle-charger D will continue to supply current to the battery $B_1$, the voltage of which will then slowly drop to the normal floating voltage of 2.15 volts per cell. The voltage of the floating generator $G_1$ may then be gradually reduced and the resistance of the rheostat $R_0$ also gradually reduced until all of its resistance has been cut out. It is to be noted that the generator $G_2$ should be able to produce a voltage somewhat higher than that of the floating generator $G_1$, and the generator $G_2$ should be able to charge battery $B_1$ at the normal eight-hour rate.

It will be apparent that the generator $G_1$ is arranged to supply current to the output circuit $O_2$ under ordinary conditions and that this generator, while connected across batteries $B_1$ and $B_2$, runs as long as power is available at the input circuit $O_1$. The generator $G_2$ will ordinarily remain unoperated, the switches $S_2$ and $S_4$ being normally open, and the trickle-charger D will continually supply the usual energy losses encountered by battery $B_1$, which remains idle particularly because its voltage is less than the voltage $V_1$ of the output circuit $O_2$. However, after a power failure has occurred and service has been subsequently restored, the battery $B_1$ will be in a partially discharged condition and the generator $G_2$ will be connected to its associated circuits by the closure of switches $S_2$ and $S_4$. The generator $G_2$ is employed to recharge the battery $B_1$ to its normal voltage. While this is being done, it will be necessary to slowly raise the voltage of the generator $G_1$ and this, of course, may be accomplished by reducing the magnitude of the resistance $R_1$. Furthermore, the voltage of the generator $G_1$ must not be raised so high as to be greater than the additive values of the normal charging voltage of the battery $B_1$ and the critical voltage of the battery $B_2$ ($1.75 \times Y$); for if this value should be exceeded, current will flow from the generator $G_1$ into the battery $B_1$ and the generator $G_1$ will become overloaded. At the same time the voltage of the battery $B_1$ will have risen to its normal charging voltage, and the voltage of this battery, which is $V_2$, will be greater than the voltage at the output circuit $O_2$ if the generator $G_1$ is not increased in voltage as above described. Current may then also flow from the battery $B_1$ through the battery $B_2$ to the generator $G_1$, and therefore the circuit-breaker $K_1$ will be operated to disconnect the generator $G_1$ from its associated circuits. The generator $G_2$ will then supply the entire load to the output circuit $O_2$ as well as the current required to charge the battery $B_1$.

It will be apparent that the battery control circuit shown and described in this application permits the voltage at the output circuit $O_2$ to be maintained highly constant at some predetermined value while the main battery $B_1$ is being either charged or discharged.

The filter F is employed for the purpose of suppressing alternating currents which may be superimposed upon and introduced into the system due to commutator ripples, etc., from generators $G_1$ and $G_2$. This filter may have a cut-off frequency of, for example, 70 or 80 cycles. It is also to be noted that this filter will present crosstalk in the output circuit $O_2$ which may occur because of the common impedance presented by the rheostat $R_0$.

It will be understood that while this invention has been shown in one particular embodiment merely for the purpose of illustration, the general principles of this invention may be applied to other and widely varied organizations without departing from the spirit of the invention and the scope of the appended claims.

What is claimed is:

1. In a system transmitting current from an input circuit to an output circuit, the combination of a plurality of secondary sources of electromotive force connected in series with each other, a plurality of sources of counter-electromotive force connected in series with each other and with said secondary sources, the series circuit of said sources being connected in shunt with the input and output circuits, a variable resistance, means for connecting said resistance in series with all of said sources and in series with said output circuit, and means for connecting said resistance in parallel with all of the sources of counter-electromotive force.

2. The combination of a storage battery, a battery of cells of counter-electromotive force, a first direct current generator connected to said storage battery, and a second direct current generator connected in series with both batteries.

3. The combination of a first battery of secondary cells, a second battery of cells of counter-electromotive force, a first direct current generator connected to the storage battery, a second direct current generator connected in series with both batteries, and a trickle-charger also connected to said storage battery.

4. The combination of a source of alternating current, first and second motor generator sets connected in parallel with said source, a storage battery, a battery of cells of counter-electromotive force connected in series with said storage battery, a trickle-charger coupled to said alternating current source, the generator of the first set and said trickle-charger being connected in parallel with said storage battery, the generator of the second set being connected in series with both batteries.

5. The combination of a source of alternating current, first and second generators operated from said source, a storage battery, a battery of counter-electromotive force cells in series with said storage battery, an output circuit connected across both batteries, and a trickle-charger coupled to the alternating current source, the first generator and the trickle-charger being connected in parallel with the storage battery, the second generator being connected across the output circuit.

6. In a battery control system, a load circuit to be supplied with current, a battery, counter-electromotive force cells in series arrangement with said battery and across said load circuit, a rheostat, and manual means for connecting said rheostat in parallel with said counter-electromotive force cells or in series with said load circuit.

7. In a system for supplying current to a translating circuit, the combination of a secondary battery, a battery of counter cells, said batteries being connected in series with each other and in shunt with the translating circuit, and a rheostat connected in shunt across said battery of counter cells.

8. In a system for supplying current to a translating circuit, the combination of a storage battery, a battery of counter cells connected in series with the storage battery, said series batteries being connected in shunt with the translating circuit, a rheostat, and means for connecting said rheostat in shunt with said battery of counter cells or in series with said translating circuit.

9. The combination of a source of direct current, a translating circuit, a storage battery connected in shunt with said source of direct current, a battery of counter cells, said batteries being connected in series with each other and in shunt with said translating circuit, and a rheostat connected in shunt with the battery of counter cells.

10. In a system for supplying current to a translating circuit, the combination of a storage battery, a battery of counter cells, a generator connected in series with both the storage battery and the battery of counter cells, said generator being also connected across the translating circuit, and a rheostat connected in shunt with the battery of counter cells.

11. Apparatus for connection across an input circuit and an output circuit which is to be supplied with current from said input circuit comprising, in combination, a source of direct current potential, a battery of counter cells connected in series with said source of direct current potential, and a rheostat connected in shunt with said battery of counter cells and having a resistance which will normally produce a voltage drop greater than the critical voltage of said battery of counter cells.

In testimony whereof, I have signed my name to this specification this 15th day of March, 1930.

WILLIAM H. T. HOLDEN.